(12) United States Patent
Hedden

(10) Patent No.: US 6,890,650 B2
(45) Date of Patent: May 10, 2005

(54) GLASS FIBER SIZING COMPOSITIONS, SIZED GLASS FIBERS, AND POLYOLEFIN COMPOSITES

(75) Inventor: Jerry C. Hedden, Shelby, NC (US)

(73) Assignee: PPG Industries Ohio, Inc., Cleveland, OH (US)

(*) Notice: Subject to any disclaimer, the term of this patent is extended or adjusted under 35 U.S.C. 154(b) by 30 days.

(21) Appl. No.: 10/625,405

(22) Filed: Jul. 23, 2003

(65) Prior Publication Data

US 2004/0131850 A1 Jul. 8, 2004

Related U.S. Application Data

(60) Provisional application No. 60/398,168, filed on Jul. 23, 2002.

(51) Int. Cl.$^7$ .............................. D02G 3/00; C08K 3/40
(52) U.S. Cl. ....................... 428/391; 428/375; 428/378; 428/392; 252/8.83; 252/8.81; 106/287.15; 524/492; 524/494
(58) Field of Search ................................ 428/375, 378, 428/391, 392; 252/8.81, 8.83; 106/287.15; 524/492, 494; 8/115.51, 115.6

(56) References Cited

U.S. PATENT DOCUMENTS

| | | | |
|---|---|---|---|
| 2,994,619 A | | 8/1961 | Eilerman |
| 4,271,229 A | | 6/1981 | Temple |
| 4,618,389 A | * | 10/1986 | Agodoa .................. 156/307.5 |
| 5,312,940 A | | 5/1994 | Grubbs et al. |
| 5,342,909 A | | 8/1994 | Grubbs et al. |
| 5,424,384 A | * | 6/1995 | Gentle et al. ................. 528/12 |
| 5,428,098 A | | 6/1995 | Brekner et al. |
| 5,468,826 A | * | 11/1995 | Gentle et al. ................. 528/15 |
| 5,712,036 A | | 1/1998 | Piret |
| 5,831,108 A | | 11/1998 | Grubbs et al. |
| 5,849,851 A | | 12/1998 | Grubbs et al. |
| 5,917,071 A | | 6/1999 | Grubbs et al. |
| 5,939,504 A | | 8/1999 | Woodson, Jr. et al. |
| 5,973,067 A | * | 10/1999 | Nakamura et al. .......... 524/858 |
| 6,310,121 B1 | | 10/2001 | Woodson, Jr et al. |
| 6,323,296 B1 | | 11/2001 | Warner et al. |
| 6,409,875 B1 | | 6/2002 | Giardello et al. |
| 6,436,476 B1 | | 8/2002 | Sage, Jr. |
| 6,525,125 B1 | | 2/2003 | Giardello et al. |
| 2002/0153096 A1 | | 10/2002 | Giardello et al. |
| 2004/0073053 A1 | * | 4/2004 | Nguyen et al. ............. 556/482 |
| 2004/0131850 A1 | * | 7/2004 | Hedden ...................... 428/375 |

FOREIGN PATENT DOCUMENTS

| | | |
|---|---|---|
| EP | 0 424 833 B1 | 1/1996 |
| WO | WO 86/01811 | 3/1986 |
| WO | WO 01/49628 A1 | 7/2001 |
| WO | WO 0160903 | 8/2001 |

OTHER PUBLICATIONS

Loewenstein, K., *The Manufacturing Technology of Continuous Glass Fibres*, (3d Ed. 1993), at pages 30–44, 47–103, and 115–165.

Uetsuji, Y., et al., *Development of Textile Composites Impregnated with Dicyclopentadiene Resin*, Design and Manufacturing of Composites, Proceedings of the Joint Canada–Japan Workshop on Composites, 3$^{rd}$, Kyoto, Japan, Mar. 6–8, 2000, 375–380.

* cited by examiner

*Primary Examiner*—Rena Dye
*Assistant Examiner*—J. M. Gray
(74) *Attorney, Agent, or Firm*—Dennis C. Millman

(57) ABSTRACT

A sizing composition for glass fibers comprises at least one film-former, at least one silane comprising an alkenyl group comprising a straight chain segment of at least five carbon atoms, wherein at least one carbon-carbon double bond is terminal and wherein the carbon atoms on the terminal double bond are unsubstituted, and at least one lubricant. The sizing composition can be used to coat glass fibers for use as reinforcement for cycloolefins that cure by the ring-opening metathesis polymerization ("ROMP") reaction.

49 Claims, No Drawings

GLASS FIBER SIZING COMPOSITIONS, SIZED GLASS FIBERS, AND POLYOLEFIN COMPOSITES

CROSS REFERENCE TO RELATED APPLICATION

This application claims priority to, and incorporates by reference in full, the following co-pending application of Applicant: U.S. Provisional Patent Application No. 60/398,168, filed Jul. 23, 2002, entitled "Glass Fiber Sizings, Sized Glass Fibers, and Polyolefin Reinforced Articles."

FIELD OF THE INVENTION

The present invention relates generally to sizing compositions for fiber glass and, in particular, to sizing compositions for fiber glass suitable to reinforce polyolefin articles.

BACKGROUND OF THE INVENTION

The present invention is directed to chemically treated glass fibers, strands or yarn where the fibers impart improved strength in reinforcing polyolefins.

Glass fibers are produced by flowing molten glass via gravity through a multitude of small openings in a precious metal device, called a bushing. Typical formulations of glass fibers are disclosed in K. Loewenstein, *The Manufacturing Technology of Continuous Glass Fibres*, (3d Ed. 1993).

After the fibers have cooled very shortly after their issuance from the bushing and usually in close proximity to the bushing, these fibers are treated with a chemical treating formulation usually referred to in the art as a sizing composition, sizing, or size. The sizing composition serves to make the fibers more compatible with the material they will ultimately be used to reinforce and to make the fibers more easy to process. The sizing composition can be applied by sprayers, rollers, belts, metering devices or any similar application device. The sized glass fibers are gathered into bundles or strands comprising a plurality of individual fibers, generally from 200 to more than 4000.

After their formation and treatment, the strands can be wound into a spool or "forming package" and/or may be chopped. The forming packages or chopped strands are usually dried in either an oven or at room temperature to remove some of the moisture from the fibers. Strands from the forming packages may also be wound into rovings.

The strands of treated fibers can be used to reinforce various materials such as thermoplastic polymers and thermosetting polymers. One example of a commercially important use of treated fibers is to reinforce olefinic thermosetting polymers, especially polymers of cycloolefins. It would be desirable to have commercial fiber glass materials that are effective reinforcements for cycloolefinic resins that cure by the ring-opening metathesis polymerization ("ROMP") reaction. In particular, it would be desirable to have commercial fiber glass materials that are effective reinforcements for polymers formed from dicyclopentadiene ("DCPD") monomer.

There is a growing need for an effective fiber glass reinforcement for DCPD resins. These resins have a number of advantages over more conventional thermoset resins, especially the widely used polyester resins that have styrene as a co-monomer and diluent. As environmental controls become more stringent on VOC's, a cost-competitive, low viscosity (needed for fast wetting of glass fibers) resin system that cures without styrene co-monomer/diluent is desirable.

SUMMARY

The present invention relates to sizing compositions, to fiber glass at least partially coated with a sizing composition, and to composites formed from cycloolefins and reinforced with fiber glass at least partially coated with a sizing composition of the present invention. The present invention also relates to methods of forming fiber glass strands and methods of forming polyolefin composites.

Fiber glass strands at least partially coated with sizing compositions of the present invention may impart desirable or improved strength when used to reinforce polyolefin articles, such as cycloolefins that cure by ring opening metathesis polymerization. Sizing compositions of the present invention utilize coupling agents that are believed to improve the adhesion between a fiber glass reinforcement coated with the sizing composition and the polyolefin resin. In addition, because a ROMP catalyst is often used to cure cycloolefins, the sizing compositions of the present invention are also adapted to not poison the ROMP catalysts. For example, certain groups on typical sizing composition components may cause a component of the sizing composition to react with the ROMP catalyst to form a product that is no longer a catalyst, such that the catalyst would be consumed without polymerizing the monomers.

In one embodiment of the present invention, a sizing composition for glass fibers comprises at least one film-former, at least one lubricant, and at least one silane comprising an alkenyl group comprising a straight chain segment of at least five carbon atoms, wherein at least one carbon-carbon double bond is terminal and wherein the carbon atoms on the terminal double bond are unsubstituted. In a further non-limiting embodiment, the at least one silane comprises an alkenyl group comprising a straight chain segment of from five to seven carbon atoms, wherein at least one carbon-carbon double bond is terminal and wherein the carbon atoms on the terminal double bond are unsubstituted.

In one non-limiting embodiment, the at least one silane may comprise at least one of 5-hexenyltrimethoxysilane, 6-heptenyltrimethoxysilane, and 7-octenyltrimethoxysilane. In a further embodiment, the at least one silane may comprise 5-hexenyltrimethoxysilane. In other embodiments, a sizing composition may comprise two are more silanes that do not adversely effect polymerization of the cycloolefin.

The at least one film-former, in some embodiments, comprises at least one of epoxies, polyvinyl acetates, polyesters, and other film-formers without functional groups that would interfere with ROMP reactions.

Non-limiting embodiments of the present invention may also comprise at least one non-ionic lubricant and/or at least one cationic lubricant. Some cationic lubricants have the potential to poison the ROMP catalyst. However, some amount of cationic lubricant may be necessary in embodiments of the present invention to reduce fiber-to-fiber abrasion. Thus, in embodiments of the present invention utilizing a cationic lubricant, the concentration of the cationic lubricant may be sufficiently low to avoid poisoning a ring-opening metathesis polymerization catalyst.

Another embodiment of a sizing composition for glass fibers of the present invention comprises at least one film-former in an amount ranging from about 40 weight percent to about 70 weight percent on a total solids basis; at least one silane comprising an alkenyl group comprising a straight chain segment of at least five carbon atoms, wherein at least one carbon-carbon double bond is terminal and wherein the carbon atoms on the terminal double bond are unsubstituted, in an amount ranging from about 5 weight percent to about 15 weight percent on a total solids basis; at least one nonionic lubricant in an amount ranging from about 20 weight percent to about 50 weight percent on a total solids basis; and at least one cationic lubricant, in an amount ranging up to about 2 weight percent on a total solids basis.

The present invention also relates to fiber glass strands comprising at least one glass fiber at least partially coated with a sizing composition of the present invention.

The present invention also relates to polyolefin composites. In one embodiment, a polyolefin composite of the present invention comprises: (a) a plurality of glass fibers at least partially coated with a sizing composition, the sizing composition comprising: (i) at least one film-former; (ii) at least one silane comprising an alkenyl group comprising a straight chain segment of at least five carbon atoms, wherein at least one carbon-carbon double bond is terminal and wherein the carbon atoms on the terminal double bond are unsubstituted; and (iii) at least one lubricant; and (b) a polyolefin prepared by polymerizing a cycloolefin using a ring-opening metathesis polymerization catalyst. The polyolefin, in one non-limiting embodiment, may comprise polymers formed by polymerizing dicyclopentadiene.

These and other embodiments of the present invention are described in greater detail in the detailed description of the invention which follows.

DETAILED DESCRIPTION OF THE INVENTION

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

In one embodiment, the present invention relates to sizing compositions for coating materials used to reinforce composites. While a number of reinforcing materials may be used to reinforce composites, including, for example, polyester fibers, polyolefin fibers, and polyamide fibers, embodiments of sizing compositions of the present invention are particularly suitable for use in coating glass fibers.

Embodiments of the present invention are directed to sizing compositions for glass fibers. The sizing compositions in non-limiting embodiments of the present invention are useful in coating fiber glass to be used as reinforcement for cycloolefins that cure by the ring-opening metathesis polymerization ("ROMP") reaction. The polymerization of cycloolefins via ROMP reactions usually requires the presence of a ROMP catalyst to cure the composite. Examples of ROMP catalysts for polymerization of cycloolefins include ruthenium or osmium metal carbene catalysts. Examples of ruthenium or osmium metal carbene catalysts are described, for example, in U.S. Pat. Nos. 6,436,476, 6,310,121, 5,939, 504, 5,917,071, 5,849,851, 5,831,108, 5,342,909, and 5,312, 940, which are hereby incorporated by reference. Suitable catalysts, such as Tricyclohexylphosphine [1,3-bis(2,4,6-trimethylphenyl)-4,5-dihydroimidazol-2-lidine] [benzylidine]ruthenium(IV)dichloride, may be available, for example, from Strem Chemicals, Inc. of Newburyport, Mass. Additional background regarding ROMP reactions and the use of such catalysts to polymerize cycloolefins may also be found in the above patents.

In non-limiting embodiments, the sizing compositions of the present invention are useful with fiber glass reinforcements in dicyclopentadiene ("DCPD") resins. While sizing compositions are primarily discussed herein in connection with their use on fiber glass reinforcements for reinforcing DCPD resins, it should be understood that the sizing compositions may also be used to at least partially coat glass fibers for reinforcing other cycloolefins that can be polymerized by a ring opening metathesis polymerization reaction, including those set forth in U.S. Pat. No. 6,436,476 and U.S. Pat. No. 6,323,296, which are hereby incorporated by reference. The sizing compositions may also be useful with fiber glass products used to reinforce other unsaturated, free radical cure resins that do not necessarily cure by ROMP, such as polyester.

The general reaction mechanism for polymerization of DCPD using ROMP is as follows:

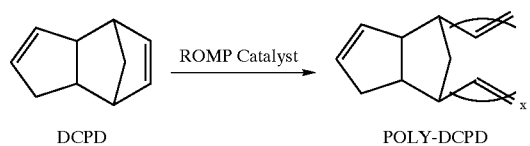

DCPD      POLY-DCPD

One difficulty in producing compatible and effective fiber glass for use as reinforcement with polymers formed from DCPD is that the various ingredients typically used in fiber glass sizing compositions may inhibit polymerization by "poisoning" the ROMP catalyst. As used herein, the term "poisoning", when used in connection with a sizing composition or components of a sizing composition, refers to a sizing composition or a component thereof that negatively affects the polymerization of a cycloolefin by, for example, inhibiting, slowing, preventing, or terminating the desired polymerization process. For example, a component of a sizing composition may react with the ROMP catalyst to produce a species that is not a catalyst, and thereby prevent the ROMP catalyst from polymerizing the monomer. Consequently, there have been continuing efforts by catalyst suppliers to reduce the sensitivity of the ROMP catalyst chemistry to sizing components. It would be desirable to have a sizing composition that would not limit curing of the DCPD, while still producing composites with an acceptable shear strength.

The present invention advantageously provides sizing compositions that are compatible with ROMP catalysts, such that the sizing compositions do not substantially inhibit polymerization by poisoning the ROMP catalyst. The sizing compositions of the present invention, when at least partially coated on glass fibers used to reinforce polymerized cycloolefins, also provide composites having adequate or desirable shear strengths. The selection of components and their relative amounts can provide such features and others.

In one non-limiting embodiment, a sizing composition of the present invention comprises at least one film-former, at least one silane comprising an alkenyl group comprising a straight chain segment of at least five carbon atoms, wherein at least one carbon-carbon double bond on the chain is terminal and wherein the carbon atoms on the terminal double bond are unsubstituted, and at least one lubricant.

Film-formers useful in non-limiting embodiments of the present invention have relatively low potentials for poisoning the ROMP catalyst used to polymerize cycloolefinic resins. To avoid poisoning ROMP catalysts, film-formers useful in non-limiting embodiments of the present invention may not include the following functional groups: primary amines, thiols, terminal epoxides, functional groups having active oxygen groups (e.g., hydroperoxides and activated epoxides), acetylenes, and vinyl ethers. Such structures are believed to poison and/or adversely effect the operation of the ROMP catalyst. As noted below, silanes and non-ionic lubricants used in embodiments of the present invention may also not include these functional groups. Certain constituents that can act as Lewis bases may also not be desirable for use as a film-former in embodiments of the present invention. Film-formers useful in embodiments of the present invention can also assist in holding fiber glass filaments together to form a strand that can be wet out by liquid resins.

The film-formers, in one non-limiting embodiment, can comprise epoxies, polyvinyl acetates, and/or polyesters. Other common film-formers that would not poison the ROMP catalyst (e.g., by reacting with the ROMP catalyst to form a non-catalytic species) could also be used.

The one or more film-formers are generally present in the sizing composition in an amount from 30 weight percent to 80 weight percent, the percentages based on the total solids of the sizing composition.

In one non-limiting embodiment, the at least one film-former comprises a low molecular weight epoxy polymer. In another non-limiting embodiment, the film-former further comprises a high molecular weight epoxy polymer. The film-formers are usually available as non-ionic, aqueous emulsions and "epoxy dispersion" will refer to one or more epoxy polymers dispersed as an aqueous emulsion. As used herein, "low molecular weight epoxy polymer" generally refers to an epoxy polymer having a molecular weight of 500 or less, such epoxy polymers typically being liquid at room temperature. As used herein, "high molecular weight epoxy polymer" generally refers to an epoxy polymer having a molecular weight of more than 500, such epoxy polymers typically being a gel or solid at room temperature.

In non-limiting embodiments comprising a low molecular weight epoxy and a high molecular weight epoxy, the majority of the film-former comprises the low molecular weight epoxies. When a low molecular weight epoxy and a high molecular weight epoxy are both used, the epoxy polymer used in the greater amount by weight may be referred to as the "major film-former" and the other epoxy polymer may be referred to as the "minor film-former."

An example of a low molecular weight epoxy useful as a film-former in a non-limiting embodiment of the present invention comprises Franklin K80-203, commercially available from Franklin International of Columbus, Ohio. Franklin K80-203 is a nonionic, aqueous dispersion of a bisphenol A epoxy resin having a molecular weight per epoxide between 182 and 192 on a solids basis. Other examples of suitable low molecular weight epoxies are commercially available from Resolution Performance Products, LLC of Houston, Tex., under the product names EPI-REZ 3510-W-60 and EPI-REZ 3515-W-60, and from DSM N.V., under the product name Neoxil 965. EPI-REZ 3510-W-60 is a nonionic, aqueous dispersion of a bisphenol A epoxy resin having a molecular weight per epoxide between 185 and 215 on a solids basis. EPI-REZ 3515-W-60 is a nonionic, aqueous dispersion of a bisphenol A epoxy resin having a molecular weight per epoxide between 225 and 275 on a solids basis. Neoxil 965 a nonionic, aqueous dispersion of a bisphenol A epoxy resin having a molecular weight per epoxide between 220 and 280 on a solids basis.

An example of a high molecular weight epoxy useful as a film-former in a non-limiting embodiment of the present invention comprises EPI-REZ 3522-W-60, commercially available from Resolution Performance Products, LLC of Houston, Tex. EPI-REZ 3522-W-60 is a nonionic, aqueous dispersion of a solid bisphenol A epoxy resin having a molecular weight per epoxide of between 615 and 715 on a solids basis. Other suitable high molecular weight epoxies, for example, are commercially available from DSM N.V., under the product names Neoxil 961/D and Neoxil 8294, as well as epoxy-ester dispersions such as Neoxil 971 from DSM. Neoxil 961/D is a nonionic, aqueous dispersion of a solid bisphenol A epoxy resin having a molecular weight per epoxide of between 3500 and 6000 on a solids basis. Neoxil 8294 is a nonionic, aqueous dispersion of a solid bisphenol A epoxy resin having a molecular weight per epoxide of between 1300 and 1700 on a solids basis. Neoxil 971 is an epoxy-ester dispersion having a molecular weight per epoxide of between 1600 and 2500 on a solids basis.

In embodiments having a major film-former and a minor film-former wherein the total amount of film-former in the sizing composition is from about 30 weight percent to about 80 weight percent based on the total solids of the sizing composition, the ratio of major film-former to minor film-former may generally be between 1:1 (e.g., the total film-former comprises about 50 weight percent major film-former) to 19:1 (e.g., the total film-former comprises about 95 weight percent major film-former). In one non-limiting embodiment, the ratio of major film-former to minor film-former is about 3:1 (e.g., the total film-former comprises about 75 weight percent major film-former). In one non-limiting embodiment, the amount of major film-former in the sizing composition may be between about 20 weight percent and about 70 weight percent based on the total solids of the sizing composition. The minor film-former, in one non-limiting embodiment, may comprise from about 1 weight percent to about 30 weight percent based on the total solids of the sizing composition.

Sizings of the present invention further comprise one or more silanes having at least one organo-functional group having terminal unsaturation (carbon-carbon double bond). The one or more silanes are capable of reacting with cyclic olefinic resins, such as dicyclopentadiene ("DCPD"), during cure. Silanes that are capable of reacting with DCPD, in some non-limiting embodiments, can participate in the polymerization and cross-linking mechanism of the DCPD resin. The silanes can have a relatively low potential to poison the ROMP catalyst.

In one non-limiting embodiment, a silane useful in a sizing composition of the present invention comprises an alkenyl group comprising a straight chain segment of at least five carbon atoms, wherein at least one carbon-carbon double bond on the chain segment is terminal and wherein the carbon atoms on the terminal double bond are unsubstituted. As used herein, "alkenyl group" includes hydrocarbon chains of either a straight or branched configuration having one or more carbon-carbon double bonds, such as, for example, alkenes and alkadienes. As understood to those of skill in the art, a "terminal" carbon-carbon double bond means that the double bond occurs at the end of the hydrocarbon radical opposite from the end bonded to the silicone atom in the silane. For example, a hexenyl group having a terminal carbon-carbon double bond would be 5-hexenyl.

In a further non-limiting embodiment, the at least one silane comprises an alkenyl group comprising a straight chain segment of from five to seven carbon atoms, wherein at least one carbon-carbon double bond is terminal and wherein the carbon atoms on the terminal double bond are unsubstituted. In this embodiment, the silane may comprise alkenyl groups, such as 4-pentenyl, 5-hexenyl, 6-heptenyl, for example. One example of such a silane that may provide desirable results as part of a sizing composition of the present invention is 5-hexenyltrimethoxysilane.

Five or more carbons in the alkenyl group are believed to improve the short-beam shear of composites made using fiber glass reinforcements coated with sizing compositions of the present invention and using cycloolefins that cure by a ROMP reaction based on the following theory. Silanes having this functionality are believed to improve the adhesion between the fiber glass reinforcement and the polyolefin resin. As set forth above, a ROMP catalyst is necessary to open the ring structure of the cycloolefin and to polymerize the cycloolefin. Typical ROMP catalysts are fairly large structures and add bulk to the cycloolefin monomers as they open. Thus, it is believed that the longer alkenyl structure of at least five carbon atoms can result in better penetration of the terminal carbon-carbon double bond into the polyolefin resin (particularly, if the ROMP catalyst is still attached to one end of the open ring) and consequently better bonding between the polyolefin resin and the silane. Thus, the coupling between the fiber glass reinforcement and the polyolefin can be improved.

Examples of silanes useful in non-limiting embodiments of the present invention include 5-hexenyltrimethoxysilane, 6-heptenyltrimethoxysilane, 7-octenyltrimethoxysilane, 5-hexenytriethoxysilane, 6-heptenyltriethoxysilane, and 7-octenyltriethoxysilane. Other potentially useful silanes may include carbon-carbon double bonds in the straight chain segment in addition to the terminal carbon-carbon double bond. While the carbons in the terminal double bond are unsubstituted, other potentially useful silanes may include carbons in the chain having functional groups attached, although any functionality would preferably not poison the ROMP catalyst. Examples of undesirable functional groups are set forth above in connection with the film-former. Such undesirable functional groups may, for example include: primary amines, thiols, terminal epoxides, hydroperoxides, activated epoxides, acetylenes, and vinyl ethers.

Examples of 5-hexenyltrimethoxysilanes useful in non-limiting embodiments of the present invention are available from Dow Corning Corporation under the product name 2-7305-INT and from United Chemical Technologies under the product name PETRARCH H7329.8. An example of an 7-octenyltrimethoxysilane useful in non-limiting embodiments of the present invention may be purchased from United Chemical Technologies, Inc. under the product name PETRARCH O9818.3.

The at least one silane comprising an alkenyl group comprising a straight chain segment of at least five carbon atoms, wherein at least one carbon-carbon double bond on the chain is terminal and wherein the carbon atoms on the terminal double bond are unsubstituted, can generally be present in the sizing composition in an amount from 1 weight percent to 25 weight percent, the percentages based on the total solids of the sizing composition. The at least one silane, in a further non-limiting embodiment, may be present in an amount from 5 weight percent to 15 weight percent, the percentages based on the total solids of the sizing composition.

Embodiments of sizing compositions of the present invention may comprise multiple silanes, wherein at least one of the silanes comprises an alkenyl group comprising a straight chain segment of at least five carbon atoms, wherein at least one carbon-carbon double bond on the chain is terminal and wherein the carbon atoms on the terminal double bond are unsubstituted. In these embodiments, at least one of the silanes is capable of reacting with cyclic olefinic resins, such as dicyclopentadiene ("DCPD"), during cure. When multiple silanes are used, each silane can have a low potential to poison the ROMP catalyst (e.g., react with the ROMP catalyst to produce a species that is not a catalyst). The potential to avoid poisoning the ROMP catalyst can be avoided by not using silanes that include, for example, the following functional groups: primary amines, thiols, terminal epoxides, hydroperoxides, activated epoxides, acetylenes, and vinyl ethers.

In another non-limiting embodiment, a silane useful in a sizing of the present invention comprises a norbornenyl-functional silane. Norbornenyl-functional silanes useful in the present invention may include norbornenyl trimethoxysilanes and norbornenyl triethoxysilanes having four or more carbon atoms in a chain between the silicon atom and the norbornenyl group.

In addition to at least one film-former and at least one silane, sizing compositions of the present invention may further comprise one or more lubricants. In one non-limiting embodiment, the lubricant comprises at least one non-ionic lubricant. As used herein, the term "non-ionic" is used in a manner normally appreciated by those of ordinary skill in the art. Non-ionic lubricants useful in embodiments of the present invention preferably do not include reactive groups or other structures that might poison the ROMP catalyst or negatively affect the polymerization of the cycloolefins. Examples of such structures and functional groups are set forth in the preceding paragraph.

Examples of non-ionic lubricants useful in embodiments of the present invention comprise ethoxylated fatty alcohols, such as ethoxylated monooleate, ethoxylated di-oleate, ethoxylated monotallate and ethoxylated di-tallate. An example of a suitable ethoxylated di-tallate is available from BASF Corporation under the product name MAPEG 600 DOT. MAPEG 600 DOT is a polyethylene glycol ditallate having an average molecular weight of 600. An example of a suitable ethoxylated di-oleate is available from BASF Corporation under the product name MAPEG 600 DO. MAPEG 600 DO is a polyethylene glycol di-oleate having an average molecular weight of 600. Other examples of ethoxylated di-tallates and ethoxylated di-oleates, as well as ethoxylated monooleates and ethoxylated monotalates, are also available from BASF Corporation under the MAPEG product line.

The at least one non-ionic lubricant can generally be present in the sizing composition in an amount from 10 weight percent to 55 weight percent, the percentages based on the total solids of the sizing composition. The at least one non-ionic lubricant, in a further non-limiting embodiment, may be present in an amount from 25 weight percent to 35 weight percent, the percentages based on the total solids of the sizing composition.

The sizing composition of the present invention may further comprise at least one cationic lubricant. In another non-limiting embodiment, the sizing composition may comprise at least one cationic lubricant without a non-ionic lubricant. As used herein, the term "cationic" is used in a manner normally appreciated by those of ordinary skill in the art. Cationic lubricants advantageously protect against fiber-to-fiber abrasion. In one non-limiting embodiment, the concentration of the cationic lubricant is sufficiently low to avoid poisoning the ROMP catalyst. While the cationic lubricant may include functional groups that may poison the ROMP catalyst (e.g., secondary amines), some cationic lubricant may be needed to protect against fiber-to-fiber abrasion. Accordingly, embodiments may use cationic lubricants in amounts that protect against fiber-to-fiber abrasion without significantly affecting the function of the ROMP catalyst.

The loss on ignition of the cationic lubricant in one non-limiting embodiment is less than 0.01%. While generally most cationic lubricants used in fiber glass sizing compositions will be suitable for use in the present invention, examples of cationic lubricants useful in non-limiting embodiments of the present invention include carboxylic acid salts of amidoamines. Examples of suitable carboxylic acid salts of amidoamines include Emery 6717L, available from Cognis Corporation, Cat X available from Rhone Poulenc, and Alubraspin 261 available from BASF.

The at least one cationic lubricant may be present in the sizing composition in an amount from 0 weight percent to 5 weight percent, the percentages based on the total solids of the sizing composition. In other non-limiting embodiments, the at least one cationic lubricants may be generally present in the sizing composition in an amount from 0 weight percent to 2 weight percent, the percentages based on the total solids of the sizing composition. The at least one cationic lubricant, in other non-limiting embodiments, may be generally present in the sizing composition in an amount from 0 weight percent to 1 weight percent, the percentages based on the total solids of the sizing composition.

The sizing composition can also optionally contain other ingredients which are known to those skilled in the art to be useful in fiber glass sizing compositions, such as emulsifiers and surfactants, antifoaming agents, biocides, humutants and the like. The sizing composition can be prepared by any method known to those skilled in the art, and applied to the fibers and/or fillers by any method known in the art.

One example of a sizing composition of the present invention may be prepared in accordance with the following formulation:

TABLE 1

| Component | Amount (gallons or pounds per 100 gallons) | % of Total Solids |
|---|---|---|
| Water (Main Mix) | 15 gallons | 0% |
| Acetic Acid[1] | 0.48 pounds | 0% |
| Organo-functional Silane[2] | 5.853 pounds | 6.54% |
| Hot Water/Non-ionic Lubricant | 5 gallons | 0% |
| Non-ionic Lubricant[3] | 10.534 pounds | 24.7% |
| Hot Water/Cationic Lubricant | 1 gallon | 0% |
| Acetic Acid | 0.020 pounds | 0% |
| Cationic Lubricant[4] | 0.077 pounds | 0.36% |
| Minor Film-Former[5] | 12.373 pounds | 17.1% |
| Major Film-Former[6] | 39.108 pounds | 51.3% |
| Water to final dilution (as needed) | | 0% |
| Total Solids = | | 100.0% |

[1]Generic glacial acetic acid.
[2]DC 2-7305-INT 5-hexenyl-trimethoxysilane from Dow Corning Corp. of Tarrytown, NY. The amount of solids for the silane was calculated after hydrolysis was complete.
[3]MAPEG 600 DOT ethoxylated di-tallate lubricant from BASF Corp.
[4]EMERY 6717 partially amidated polyethylene imine from Cognis Corporation of Cincinnati, Ohio. The amount of Emery 6717 shown in this row was mixed with the acetic acid prior to mixing with water to form the amount of mixture shown in the "Hot Water/Lubricant" row before being mixed with the other binder components.
[5]EPI-REZ 3522 aqueous dispersion of solid bisphenol A epoxy resin from Resolution Performance Products, LLC of Houston, TX.
[6]K80-203 aqueous dispersion of liquid bisphenol A epoxy resin from Franklin International.

A sizing composition comprising the ingredients in Table 1 may be prepared by first sequentially adding water, acetic acid, and the silane to a mix tank with agitation. The hot water/non-ionic lubricant may be prepared as a premixture and then added to the mix tank. The hot water/acetic acid/cationic lubricant mixture may next be prepared and added to the mix tank. The minor film-former and the major film-former may then be added directly to the mix tank. Finally, deionized water may be added to the mix tank until a final volume of one hundred gallons is attained.

The present invention also relates to fiber glass products comprising a plurality of glass fibers at least partially coated with a sizing composition of the present invention. In one non-limiting embodiment, the fiber glass product is a fiber glass strand. The fiber glass strand may be wound into a cylindrical package and dried using techniques known to those of ordinary skill in the art. These individual packages may be shipped to a composite manufacturer to make a reinforced composite. Composite manufacturers typically use strands from a plurality of packages to make a composite. In another non-limiting embodiment, a glass fiber strand may be directly wound into a fiber glass roving, dried, and shipped to a composite manufacturer. In non-limiting embodiments, a roving may comprise 4000 or more fibers, the fibers having diameters between 13 and 35 microns. In other non-limiting embodiments, the rovings are assembled rovings comprising as many as 10,000 or more fibers, the fibers having diameters between 10 and 23 microns. In some applications, chopped fiber glass strands and fiber glass mats can be used.

In non-limiting embodiments of the present invention, the loss on ignition of the sizing on the fiber glass can generally be between 0.1 and 2.0%. In other non-limiting embodiments, the loss on ignition can generally be between 0.1 and 1.5%. The loss on ignition of the sizing on the fiber glass, in other non-limiting embodiments, can generally be between 0.1% and 0.8%.

The present invention also relates to methods of forming a plurality of glass fibers having sizings of the present invention applied thereon. Any glass fiber suitable for reinforcing can suitably be treated in accordance with the present invention. Non-limiting examples of glass fibers suitable for use in the present invention can include those prepared from fiberizable glass compositions such as "E-glass", "A-glass", "C-glass", "S-glass", "ECR-glass" (corrosion resistant glass), and fluorine and/or boron-free derivatives thereof.

The glass fibers of the present invention can be formed in any suitable method known in the art, for forming glass fibers. For example, glass fibers can be formed in a direct-melt fiber forming operation or in an indirect, or marble-melt, fiber forming operation. In a direct-melt fiber forming operation, raw materials are combined, melted and homogenized in a glass melting furnace. The molten glass moves from the furnace to a forehearth and into fiber forming apparatuses where the molten glass is attenuated into continuous glass fibers. In a marble-melt glass forming operation, pieces or marbles of glass having the final desired glass composition are preformed and fed into a bushing where they are melted and attenuated into continuous glass fibers. If a premelter is used, the marbles are fed first into the premelter, melted, and then the melted glass is fed into a fiber forming apparatus where the glass is attenuated to form continuous fibers. In the present invention, the glass fibers can be formed by the direct-melt fiber forming operation. For additional information relating to glass compositions and methods of forming the glass fibers, see K. Loewenstein, *The Manufacturing Technology of Continuous Glass Fibres*, (3d Ed. 1993), at pages 30–44, 47–103, and 115–165, which are specifically incorporated by reference herein. Immediately after formation, the filaments are at least partially coated with an embodiment of the sizing composition described above. The application of sizing to glass fibers is well known in the art and can be accomplished by conventional methods such as a belt applicator, a "kiss-roll" applicator or by spraying. The glass fibers are then gathered into at least one strand, and collected into a forming package on a winder. See generally K. Loewenstein, *The Manufacturing Technology of Continuous Glass Fibres*, (3d Ed. 1993).

The present invention also relates to polyolefin composites reinforced with sized glass fibers, wherein the sizing comprises a sizing composition of the present invention. In one non-limiting embodiment, the polyolefin comprises polymers formed from cyclic olefins. In a further non-limiting embodiment, the cyclic olefins are cured by ROMP catalysts. In another non-limiting embodiment, the polyolefin comprises polymers formed from DCPD. In a further non-limiting embodiment, the DCPD monomer is cured by ROMP catalysts.

In other non-limiting embodiments, composites of the present invention have a bonding strength of greater than 4,000 pounds per square inch (psi) as determined by short-beam shear (SBS) testing. In other non-limiting embodiments, the composites have a bonding strength of greater than 5,000 psi as determined by SBS testing. Composites of the present invention, in other non-limiting embodiments, have a bonding strength of greater than 6,000 psi as determined by SBS testing.

It was observed that composites utilizing rovings coated with sizings of the present invention can exhibit improved glass-matrix resin bonding strengths over composites utilizing conventional fiber glass reinforcements. Short-beam shear testing in accordance with ASTM 2344 is one way in which glass-matrix resin bonding strength can be measured.

EXAMPLES

In addition to the example of a sizing composition set forth in Table 1, other examples of sizing compositions of the present invention are set forth in Table 2. The preparation of Formulation 1 is described in connection with Table 1 above. Formulations 2 and 3 may be similarly prepared.

TABLE 2

| Sizing Component | Material Trade Name | Formulation 1 | Formulation 2 | Formulation 3 |
|---|---|---|---|---|
| Ethoxylated Di-Tallate lubricant | Mapeg 600 DOT [BASF] | 24.7 | 24.7 | 45.33 |
| Cationic lubricant | Emery 6717L [Cognis Corp.] | 0.36 | 0.36 | 0.67 |
| Film-former (Major) | Franklin K80-203 (low MW epoxy) [Franklin International] | 51.3 | — | 31.5 |
| Film-former (Minor) | Epirez 3522 (high MW epoxy) [Resolution Performance Prods.] | 17.1 | — | 10.5 |
| Film-former (Major) | Duraset 675 (polyvinyl acetate latex) [Franklin International] | — | 68.4 | — |
| Film-former (Major) | Neoxil 954/D (Polyester resin emulsion) [DSM Composite Resins, Inc.] | — | — | — |
| Organo-functional Silane | Y-15430 (norbornenyl-trimethoxy silane) [OSi Specialties] | — | — | 12.0 |
| Organo-functional Silane | DC 2-7305-INT[7] (5-hexenyl-trimethoxy silane) [Dow Corning Corp.] | 6.54 | 6.54 | — |

Desirable characteristics, which can be exhibited by the present invention, include, but are not limited to the provision of: sizing compositions which are suitable for fiber glass that may be used to reinforce cycloolefinic resins cured by ROMP catalysts; sizing compositions which are suitable for fiber glass to reinforce DCPD resins cured by ROMP catalysts; sizing compositions that can potentially participate in the polymerization and cross-linking mechanism of the DCPD resin; sizing compositions that utilize ingredients having a low potential to deactivate the ROMP catalyst; fiber glass that is effective reinforcement for cycloolefinic resins that cure by the ROMP reaction; fiber glass that is effective reinforcement for DCPD resins that cure by the ROMP reaction; DCPD composites having desirable shear strengths; DCPD composites having SBS values that substantially approach the SBS value of un-reinforced cured DCPD resin; and a cost-competitive, low viscosity resin system (e.g., a resin system developed from DCPD monomer) that cures without styrene co-monomer/diluent.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A sizing composition for glass fibers, comprising
   at least one film-former;
   at least one lubricant; and
   at least one silane comprising an alkenyl group comprising a straight chain segment of five to seven carbon atoms, wherein at least one carbon-carbon double bond is terminal and wherein the carbon atoms on the terminal double bond are unsubstituted.

2. The sizing composition of claim 1, wherein the at least one silane comprises at least one of 5-hexenyltrimethoxysilane and 6-heptenyltrimethoxysilane.

3. The sizing composition of claim 1, wherein the at least one silane comprises 5-hexenyltrimethoxysilane.

4. The sizing composition of claim 1, wherein the at least one silane comprises from about 1 to about 25 percent by weight of the sizing composition on a total solids basis.

5. The sizing composition of claim 1, wherein the at least one silane comprises from about 5 to about 15 percent by weight of the sizing composition on a total solids basis.

6. The sizing composition of claim 1, wherein the at least one silane does not comprise any of the following functional groups: primary amines, thiols, terminal epoxides, hydroperoxides, activated epoxides, acetylenes, and vinyl ethers.

7. The sizing composition of claim 1, wherein the at least one film-former does not comprise any of the following functional groups: primary amines, thiols, terminal epoxides, hydroperoxides, activated epoxides, acetylenes, and vinyl ethers.

8. The sizing composition of claim 1, wherein the at least one film-former comprises at least one of epoxies, polyvinyl acetates, and polyesters.

9. The sizing composition of claim 1, wherein the at least one film-former comprises an epoxy having an epoxide equivalent molecular weight of 500 or less.

10. The sizing composition of claim 9, wherein a second film-former comprises a second epoxy having an epoxide equivalent molecular weight of 500 or more.

11. The sizing composition of claim 10, wherein the amount of the first epoxy in the sizing composition is greater than the amount of the second epoxy.

12. The sizing composition of claim 1, wherein the at least one film-former comprises from about 30 to about 80 percent by weight of the sizing composition on a total solids basis.

13. The sizing composition of claim 1, wherein the at least one lubricant comprises at least one non-ionic lubricant.

14. The sizing composition of claim 13, wherein the at least one non-ionic lubricant does not comprise any of the following functional groups: primary amines, thiols, terminal epoxides, hydroperoxides, activated epoxides, acetylenes, and vinyl ethers.

15. The sizing composition of claim 14, wherein the at least one non-ionic lubricant comprises at least one ethoxylated fatty alcohol.

16. The sizing composition of claim 14, wherein the at least one non-ionic lubricant comprises up to about 55 percent by weight of the sizing composition on a total solids basis.

17. The sizing composition of claim 1, wherein the at least one lubricant comprises at least one cationic lubricant.

18. The sizing composition of claim 17, wherein the concentration of the cationic lubricant is sufficiently low to avoid poisoning a ring-opening metathesis polymerization catalyst.

19. The sizing composition of claim 17, wherein the at least one cationic lubricant comprises up to about 2 percent by weight of the sizing composition on a total solids basis.

20. A sizing composition for glass fibers, comprising
    at least one film-former in an amount ranging from about 40 weight percent to about 70 weight percent on a total solids basis;
    at least one non-ionic lubricant in an amount ranging from about 20 weight percent to about 50 weight percent on a total solids basis;
    at least one cationic lubricant in an amount ranging up to about 2 weight percent on a total solids basis; and
    at least one silane comprising an alkenyl group comprising a straight chain segment of five to seven carbon atoms, wherein at least one carbon-carbon double bond is terminal and wherein the carbon atoms on the terminal double bond are unsubstituted, in an amount ranging from about 5 weight percent to about 15 weight percent on a total solids basis.

21. The sizing composition of claim 20, wherein the at least one silane comprises at least one of 5-hexenyltrimethoxysilane and 6-heptenyltrimethoxysilane.

22. The sizing composition of claim 20, wherein the at least one silane comprises 5-hexenyltrimethoxysilane.

23. A fiber glass strand comprising at least one glass fiber at least partially coated with a sizing composition, the sizing composition comprising:
    at least one film-former;
    at least one lubricant; and
    at least one silane comprising an alkenyl group comprising a straight chain segment of five to seven carbon atoms, wherein at least one carbon-carbon double bond is terminal and wherein the carbon atoms on the terminal double bond are unsubstituted.

24. The fiber glass strand of claim 23, wherein the at least one silane comprises at least one of 5-hexenyltrimethoxysilane and 6-heptenyltrimethoxysilane.

25. The fiber glass strand of claim 23, wherein the at least one silane comprises 5-hexenyltrimethoxysilane.

26. The fiber glass strand of claim 23, wherein the at least one silane does not comprise any of the following functional groups: primary amines, thiols, terminal epoxides, hydroperoxides, activated epoxides, acetylenes, and vinyl ethers.

27. The fiber glass strand of claim 23, wherein the at least one film-former does not comprise any of the following functional groups: primary amines, thiols, terminal epoxides, hydroperoxides, activated epoxides, acetylenes, and vinyl ethers.

28. The fiber glass strand of claim 23, wherein the at least one film-former comprises at least one of epoxies, polyvinyl acetates, and polyesters.

29. The fiber glass strand of claim 23, wherein the at least one film-former comprises an epoxy having an epoxide equivalent molecular weight of 500 or less.

30. The fiber glass strand of claim 29, wherein a second film-former comprises a second epoxy having an epoxide equivalent molecular weight of 500 or more.

31. The fiber glass strand of claim 30, wherein the amount of the first epoxy in the sizing composition is greater than the amount of the second epoxy.

32. The fiber glass strand of claim 23, wherein the at least one lubricant comprises at least one non-ionic lubricant.

33. The fiber glass strand of claim 32, wherein the at least one non-ionic lubricant comprises at least one ethoxylated fatty alcohol.

34. The fiber glass strand of claim 23, wherein the at least one lubricant comprises at least one cationic lubricant.

35. The fiber glass strand of claim 34, wherein the at least one cationic lubricant comprises up to about 2 percent by weight of the sizing composition on a total solids basis.

36. A polyolefin composite, comprising:
(a) a plurality of glass fibers at least partially coated with a sizing composition, the sizing composition comprising:
 (i) at least one film-former;
 (ii) at least one lubricant; and
 (ii) at least one silane comprising an alkenyl group comprising a straight chain segment of five to seven carbon atoms, wherein at least one carbon-carbon double bond is terminal and wherein the carbon atoms on the terminal double bond are unsubstituted; and
(b) a polyolefin prepared by polymerizing a cycloolefin using a ring-opening metathesis polymerization catalyst.

37. The polyolefin composite of claim 36, wherein the polyolefin comprises polymers formed by polymerizing dicyclopentadiene.

38. The polyolefin composite of claim 36, wherein the at least one silane comprises at least one of 5-hexenyltrimethoxysilane and 6-heptenyltrimethoxysilane.

39. The polyolefin composite of claim 36, wherein the at least one silane comprises 5-hexenyltrimethoxysilane.

40. The polyolefin composite of claim 36, wherein the at least one silane does not comprise any of the following functional groups: primary amines, thiols, terminal epoxides, hydroperoxides, activated epoxides, acetylenes, and vinyl ethers.

41. The polyolefin composite of claim 36, wherein the at least one film-former does not comprise any of the following functional groups: primary amines, thiols, terminal epoxides, hydroperoxides, activated epoxides, acetylenes, and vinyl ethers.

42. The polyolefin composite of claim 36, wherein the at least one film-former comprises at least one of epoxies, polyvinyl acetates, and polyesters.

43. The polyolefin composite of claim 36, wherein the at least one film-former comprises an epoxy having an epoxide equivalent molecular weight of 500 or less.

44. The polyolefin composite of claim 43, wherein a second film-former comprises a second epoxy having an epoxide equivalent molecular weight of 500 or more.

45. The polyolefin composite of claim 44, wherein the amount of the first epoxy in the sizing composition is greater than the amount of the second epoxy.

46. The polyolefin composite of claim 36, wherein the at least one lubricant comprises at least one non-ionic lubricant.

47. The polyolefin composite of claim 46, wherein the at least one non-ionic lubricant comprises at least one ethoxylated fatty alcohol.

48. The polyolefin composite of claim 36, wherein the at least one lubricant comprises at least one cationic lubricant.

49. The polyolefin composite of claim 48, wherein the at least one cationic lubricant comprises up to about 2 percent by weight of the sizing composition on a total solids basis.

* * * * *